(12) United States Patent
Bogart

(10) Patent No.: US 12,068,591 B2
(45) Date of Patent: Aug. 20, 2024

(54) UTILITY JUNCTION BOX

(71) Applicant: Michael M. Bogart, Boynton Beach, FL (US)

(72) Inventor: Michael M. Bogart, Boynton Beach, FL (US)

( * ) Notice: Subject to any disclaimer, the term of this patent is extended or adjusted under 35 U.S.C. 154(b) by 802 days.

(21) Appl. No.: 16/950,732

(22) Filed: Nov. 17, 2020

(65) Prior Publication Data

US 2021/0384715 A1   Dec. 9, 2021

Related U.S. Application Data

(60) Provisional application No. 63/036,485, filed on Jun. 9, 2020.

(51) Int. Cl.
  *H02G 3/08*   (2006.01)
  *H02G 3/14*   (2006.01)

(52) U.S. Cl.
  CPC ............. *H02G 3/088* (2013.01); *H02G 3/083* (2013.01); *H02G 3/14* (2013.01)

(58) Field of Classification Search
  CPC .......... H02G 3/14; H02G 3/088; H02G 3/083; H02G 3/081
  See application file for complete search history.

(56) References Cited

U.S. PATENT DOCUMENTS

| | | | | | |
|---|---|---|---|---|---|
| 2,573,600 | A | * | 10/1951 | Pruehs | H02G 3/0633 16/2.5 |
| 2,667,368 | A | * | 1/1954 | Ferguson | H02G 3/0633 24/135 R |
| 2,895,003 | A | * | 7/1959 | Rapata | H02G 3/0633 16/2.5 |
| 3,141,062 | A | * | 7/1964 | Rapata | F16L 5/00 174/153 G |
| 3,672,103 | A | * | 6/1972 | Kost | H02G 9/10 174/37 |
| 3,751,579 | A | * | 8/1973 | Nojiri | F16L 5/00 174/650 |
| 3,809,798 | A | * | 5/1974 | Simon | H02G 3/0633 174/59 |
| 3,858,160 | A | * | 12/1974 | Denton | H01B 17/58 439/459 |

(Continued)

FOREIGN PATENT DOCUMENTS

CN   111490502 A  *  8/2020  ............. H02G 3/081

*Primary Examiner* — William H. Mayo, III
*Assistant Examiner* — Rhadames Alonzo Miller
(74) *Attorney, Agent, or Firm* — Michael J. Corrigan

(57) ABSTRACT

There is provided a utility junction box including a plurality of sidewalls forming a housing having an open bottom opening into an interior volume for receiving one or more utility lines from a first location, one or more apertures formed in at least one sidewall of the housing, a weather guard disposed on an exterior of the at least one sidewall having a downwardly sloping front face having formed therein one aperture corresponding to each of the one or more apertures formed in the at least one sidewall of the housing and disposed directly opposite therefrom. Each aperture formed in the sidewall of the housing is configured to allow a utility line to pass from within the interior volume of the housing through the aperture and direct the utility line through the corresponding aperture formed in the weather guard to a second location exterior to the utility junction box.

20 Claims, 4 Drawing Sheets

(56) References Cited

U.S. PATENT DOCUMENTS

| | | | | | |
|---|---|---|---|---|---|
| 3,879,571 | A | * | 4/1975 | Reed | H02G 3/0633 439/456 |
| 3,958,300 | A | * | 5/1976 | Tanaka | H02G 3/0633 439/459 |
| 3,986,228 | A | * | 10/1976 | Dowse | B64D 11/0696 410/105 |
| 4,125,238 | A | * | 11/1978 | Tanaka | H02G 3/0633 16/2.5 |
| 4,162,561 | A | * | 7/1979 | Tillemans | H01B 17/58 24/134 P |
| 4,167,301 | A | * | 9/1979 | Mundschenk | H05K 5/0247 439/457 |
| 4,178,057 | A | * | 12/1979 | McCormick | H02G 3/065 439/459 |
| 4,265,420 | A | * | 5/1981 | McCormick | H01B 17/58 174/153 G |
| 4,487,386 | A | * | 12/1984 | Hehl | H02G 3/0633 174/153 G |
| 4,493,467 | A | * | 1/1985 | Borja | H02G 3/0633 174/153 G |
| 4,850,014 | A | * | 7/1989 | Gillis | H04Q 1/028 D14/240 |
| 4,857,674 | A | * | 8/1989 | Filbert | H02G 3/0633 403/252 |
| 4,886,938 | A | * | 12/1989 | Rottmar | H02G 3/0633 174/559 |
| 5,304,742 | A | * | 4/1994 | Filbert | H02G 3/0633 24/458 |
| 5,419,165 | A | * | 5/1995 | Perkins | E05B 67/383 292/288 |
| 5,563,378 | A | * | 10/1996 | Uchida | H02K 5/225 174/151 |
| 5,731,544 | A | * | 3/1998 | Burck | H02G 3/14 220/241 |
| 5,796,040 | A | * | 8/1998 | Feketitsch | H02G 3/06 174/650 |
| 7,786,391 | B1 | * | 8/2010 | Van Pelt | H02G 3/18 277/606 |
| 9,153,950 | B2 | * | 10/2015 | Yamanaka | E04D 13/00 |
| 9,419,420 | B1 | * | 8/2016 | Parrish | H02G 3/0462 |
| 9,447,907 | B1 | * | 9/2016 | Woodcock | H02G 9/04 |
| 9,742,169 | B1 | * | 8/2017 | Matsumura | H02G 3/081 |
| 10,483,735 | B1 | * | 11/2019 | Gretz | H02G 3/0481 |
| 10,765,950 | B1 | * | 9/2020 | Clementi | H01R 13/6658 |
| 10,847,958 | B1 | * | 11/2020 | Reed | H02G 3/0633 |
| 2002/0157848 | A1 | * | 10/2002 | Chiriku | B60R 16/0238 174/50 |
| 2002/0157852 | A1 | * | 10/2002 | Chiriku | H02G 3/03 174/60 |
| 2002/0168882 | A1 | * | 11/2002 | Chiriku | H01R 9/2466 439/76.2 |
| 2007/0218721 | A1 | * | 9/2007 | Naritomi | H05K 3/284 439/131 |
| 2009/0243524 | A1 | * | 10/2009 | Katayama | H02M 7/003 318/400.07 |
| 2010/0218797 | A1 | * | 9/2010 | Coyle, Jr. | H02S 40/345 174/548 |
| 2010/0230127 | A1 | * | 9/2010 | Rodenberg | H02G 3/126 174/50 |
| 2010/0270071 | A1 | * | 10/2010 | Plankell | H02G 3/126 174/502 |
| 2011/0147171 | A1 | * | 6/2011 | Bhathija | H01H 71/025 361/643 |
| 2014/0069904 | A1 | * | 3/2014 | Sammons | H02G 15/113 219/136 |
| 2015/0138785 | A1 | * | 5/2015 | Oksengendler | F21V 15/01 362/374 |
| 2016/0272073 | A1 | * | 9/2016 | Hosaka | H02M 7/44 |
| 2016/0315455 | A1 | * | 10/2016 | Kiyota | B60R 16/0238 |
| 2018/0006414 | A1 | * | 1/2018 | Ooishi | H02G 3/03 |
| 2018/0048132 | A1 | * | 2/2018 | Dinh | H02G 3/081 |
| 2018/0054050 | A1 | * | 2/2018 | Thomas | H02G 3/088 |
| 2018/0059348 | A1 | * | 3/2018 | Burkett | G02B 6/4441 |
| 2018/0310394 | A1 | * | 10/2018 | Kobayashi | H05K 7/20 |
| 2020/0211926 | A1 | * | 7/2020 | Tahara | H02G 3/16 |
| 2020/0389003 | A1 | * | 12/2020 | Kobayashi | H02G 3/0633 |
| 2021/0408774 | A1 | * | 12/2021 | Hellige | H02G 3/085 |

* cited by examiner

UTILITY JUNCTION BOX

RELATED APPLICATIONS

This application claims benefit of U.S. provisional patent application No. 63/036,485 filed on Jun. 9, 2020.

FIELD OF THE INVENTION

The present invention relates to a building materials and components, and more particularly, to a utility junction box for connecting and housing utility lines and components for installation on the exterior of a structure.

BACKGROUND OF THE INVENTION

Utility junction boxes for connecting and housing utility lines and components on the exterior of a structure such as a roof, plaza deck, parking deck terrace levee, or on the ground or other location are known in the art. Typically, these utility junction boxes protect the utility lines and connections from corrosion and damage from weather such as rain, wind and storms. Such utility junction boxes suffer from drawbacks such as degradation over time from corrosion and weather and can begin to leak causing utility line connections and components to be damaged, leaks into the building structure, are not easy to access within for repairs, and are not designed for extreme weather climates having hurricanes, hail, high winds and potential for high velocity missile impact damage resulting in costly repairs.

SUMMARY OF THE INVENTION

In an embodiment, there is provided a utility junction box including a plurality of sidewalls forming a housing having an open bottom opening into an interior volume for receiving one or more utility lines from a first location, one or more apertures formed in at least one sidewall of the housing, a weather guard disposed on an exterior of the at least one sidewall having a downwardly sloping front face having formed therein one aperture corresponding to each of the one or more apertures formed in the at least one sidewall of the housing and disposed directly opposite therefrom. Each aperture formed in the sidewall of the housing is configured to allow a utility line to pass from within the interior volume of the housing through the aperture and direct the utility line through the corresponding aperture formed in the weather guard to a second location exterior to the utility junction box.

In another embodiment, there is provided a utility junction box including a front, rear, right and left sidewall forming a housing having an open bottom opening into an interior volume for receiving one or more utility lines from a first location, one or more apertures formed in the rear sidewall of the housing, one or more apertures form in the left sidewall of the housing, and a weather guard disposed on an exterior of both the rear and left sidewalls each having a downwardly sloping front face having formed therein one aperture corresponding to each of the one or more apertures formed in the rear and left sidewalls of the housing and disposed directly opposite therefrom. Each aperture formed in the rear and left sidewalls of the housing is configured to allow at least one utility line to pass from within the interior volume of the housing through the aperture and direct the utility line through the corresponding aperture formed in the weather guards to a second location exterior to the utility junction box.

It should be understood that the present drawings are not necessarily to scale and that the embodiments disclosed herein are sometimes illustrated by fragmentary views. In certain instances, details which are not necessary for an understanding of the present invention or which render other details difficult to perceive may have been omitted. It should also be understood that the invention is not necessarily limited to the particular embodiments illustrated herein. Like numbers utilized throughout the various figures designate like or similar parts or structure.

DETAILED DESCRIPTION

Figure 1:
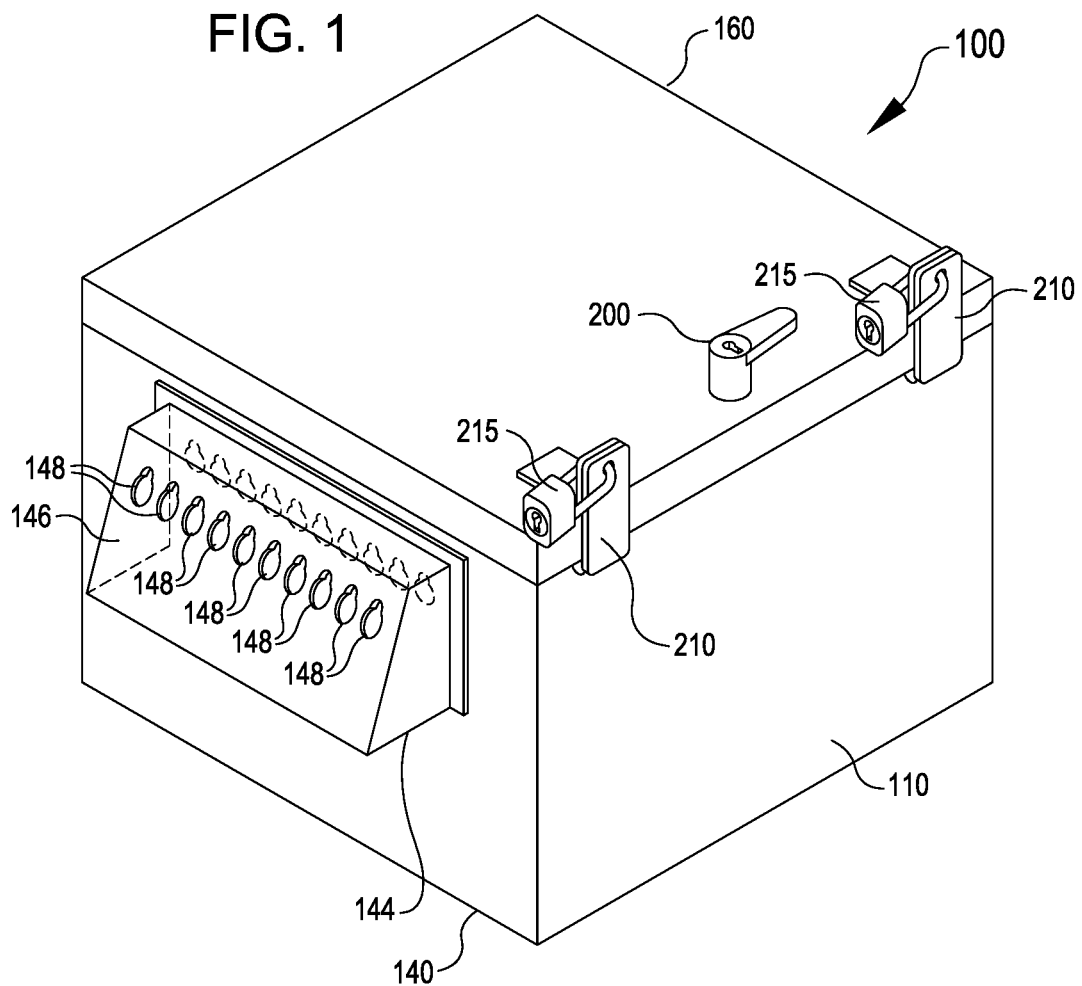
FIG. 1 is an elevated front perspective view of an embodiment of a utility junction box constructed according to the teachings of the present invention.
Figure 2:
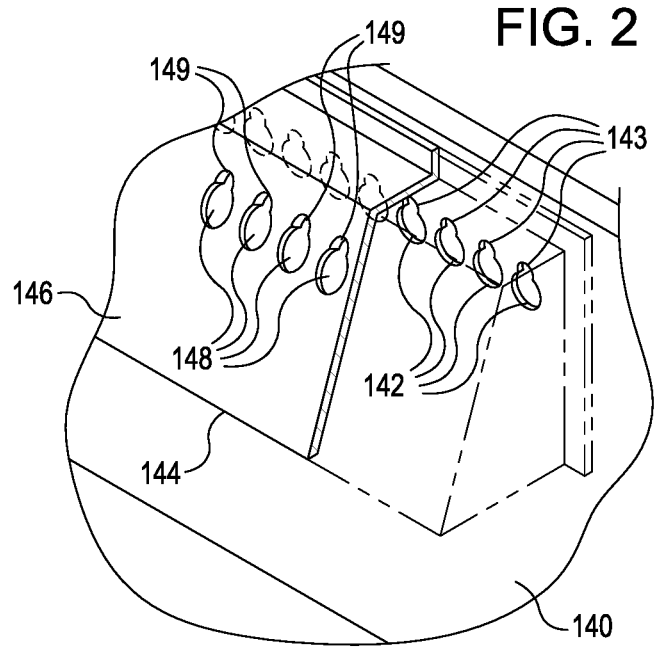
FIG. 2 is an enlarged cutaway perspective view of a portion of the weather guard mounted on the left sidewall of the utility junction box illustrated in FIG. 1.
Figure 3:
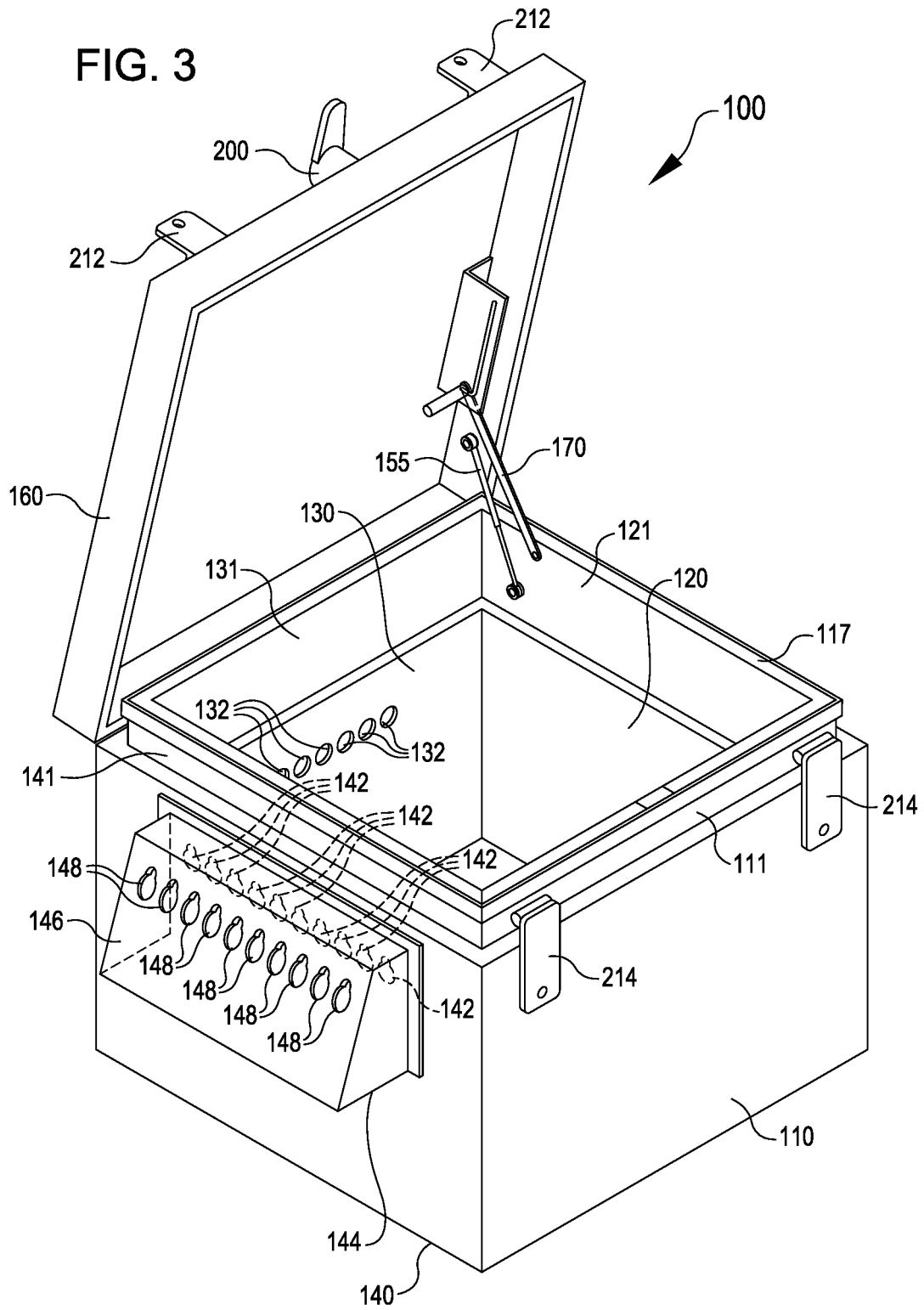
FIG. 3 is another front perspective view of the utility junction box illustrated in FIG. 1 with a lid in the open configuration.

Referring now to the drawings and, more particularly, to FIGS. 1 to 3, a utility junction box 100 constructed according to the teachings of one embodiment of the present invention is illustrated. In the illustrated embodiment, the utility junction box 100 is installed on the roof 50 (FIG. 4) of a structure such as an apartment or commercial building, house or any other structure or other location requiring a utility junction box for connecting therein utility lines and components and further directing the utility lines for connection to other utility lines or components. The utility lines and components may include plumbing, natural gas, propane, electrical and/or air conditioning (alternately refrigeration). The utility junction box 100 provides hurricane, heavy wind, rain, lightening, and missile impact resistant protection to the utility lines and components contained therein.

The utility junction box 100 is comprised of a housing including front 110, right 120, rear 130, and left 140 sidewalls, collectively forming an open bottom, and each having a recessed portion 111, 121, 131 and 141, respectively, forming an open top, and a hinged lid 160 (hinge not shown) covering the open top normally in the closed position (as shown in FIG. 1). The utility junction box 100 may be made from materials including weather, corrosion and high impact resistant metals such aluminum or stainless steel or other similar materials. The utility junction box 100 may include a weatherproofing gasket 117 installed on the upper edge of the recessed portions 111, 121, 131 and 141 for sealing the hinged lid 160 when in the closed position. The gasket 117 may be comprised of any suitable material including neoprene rubber.

Figure 4:
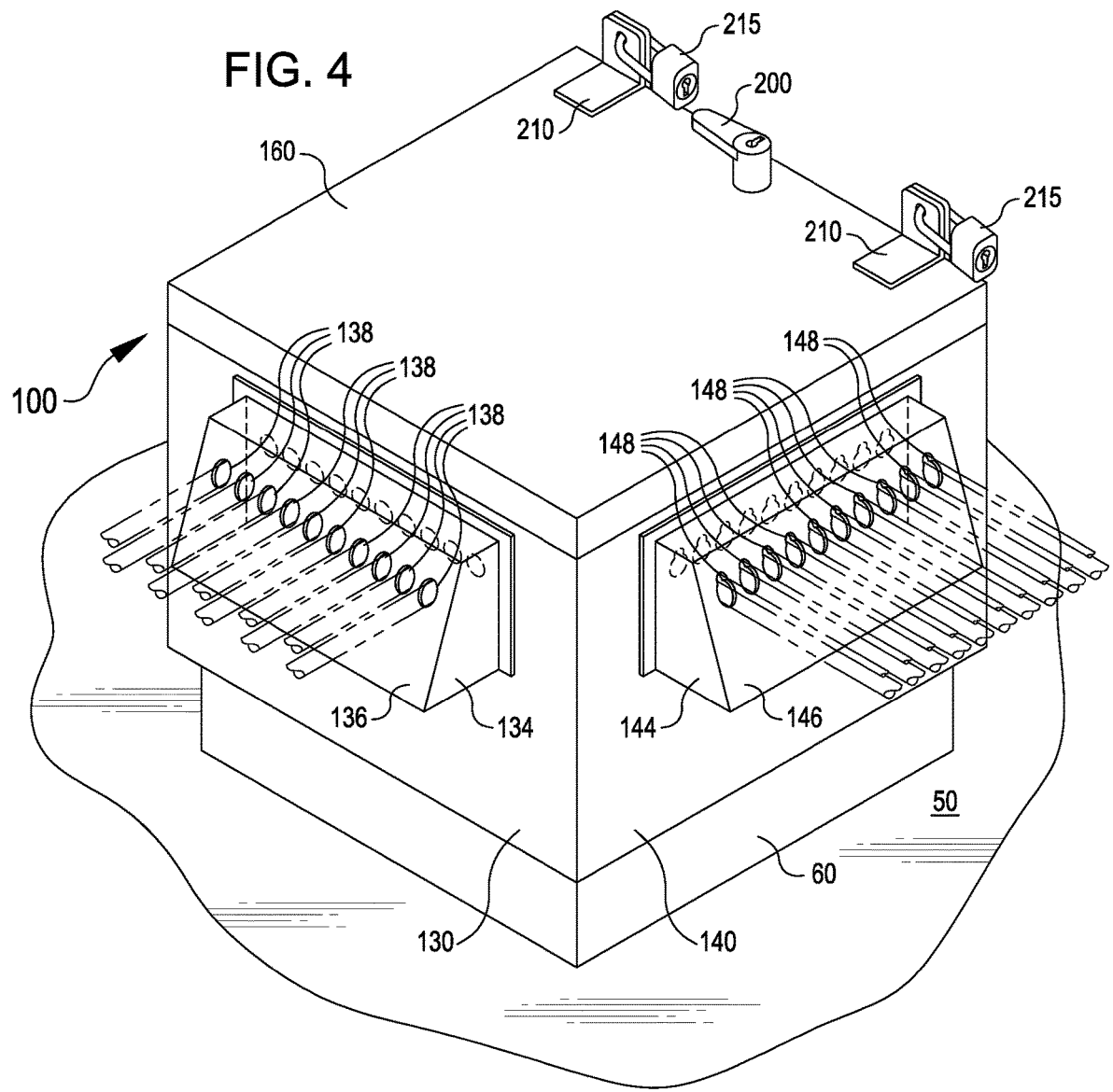
FIG. 4 is an elevated rear perspective view of the utility junction box illustrated in FIG. 1.

Referring now also to FIG. 4, the open bottom is installed over a chase 60 protruding from the roof 50 of a structure. Utility lines from within the structure may be connected to utility components or other utility lines disposed within the utility junction box 100 before being further directed through one or more apertures 132, 142 formed in the rear 130 and left 140 sidewalls of the utility junction box 100. The apertures 132, 142 are further sealed with packing, gaskets, foam, caulking or other weatherproofing materials during installation to prevent weather, wind, moisture, insects, rain etc. from entering into the interior of the utility junction box 100. The number of apertures 132, 142 is not meant to be limiting and each may be provided or formed with a knockout plug at the factory so only the number of desired apertures 132, 142 will be made available at the installation site by punching out the knockout plug of the desired apertures 132, 142.

Mounted over these apertures 132, 142 formed in the rear and left sidewalls 130, 140 of the utility junction box 100 are weather guards 134, 144 having a sloped front face 136, 146 for further deflecting rain and weather away from interior of the utility junction box 100. The weather guards 134, 144 further have apertures 138, 148 disposed in the sloped front faces 136, 146 directly opposed from their complementary apertures 132, 142 in the rear and left sidewalls 130, 140. It should be understood that openings such as apertures 138, 148 may be alternately and additionally disposed on the sidewalls 110 and 120 and complementary opposing weather guards such as weather guards 134, 144 may be alternately disposed on the sidewalls 110 and 120.

The apertures 138, 148 further direct the utility lines from within the interior of the utility junction box 100 through the apertures 132, 142 in the rear and left sidewalls 130, 140 to utility components or lines elsewhere disposed on the structure or other location. The apertures 138, 148 may be further sealed with packing, gaskets, caulking or other weatherproofing materials to prevent weather, wind, moisture, insects, rain etc. from entering into the interior of the utility junction box 100 and the weather guards 134, 144 and sealed apertures 138, 148 act as additional barriers to prevent weather, wind, moisture, insects, rain etc. from entering the interior of the utility junction box 100. The apertures 132, 142 and 138, 148 may include an arcuate portion on the upper periphery such as the arcuate portions 143, 149 shown on the apertures 142, 148 shown in FIG. 2 so that an additional utility line may pass through the apertures 132, 142 and 138, 148 such as would be typical with refrigeration and air conditioning lines that include one larger low pressure line for return of refrigerant from the evaporator from within the structure to the compressor and one smaller high pressure line from the compressor to the condenser typically located on the roof or other exterior location on or near the structure.

Figure 5:
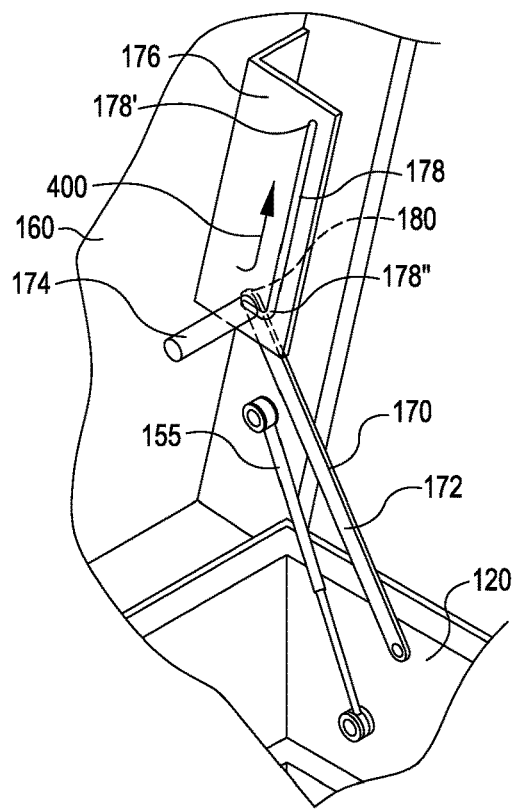
FIG. 5 is an enlarged cutaway perspective view of a portion of the utility junction box illustrated in FIG. 3 illustrating a lid latching mechanism and a lid lift assist mechanism with the lid latching mechanism in a locked configuration.
Figure 6:
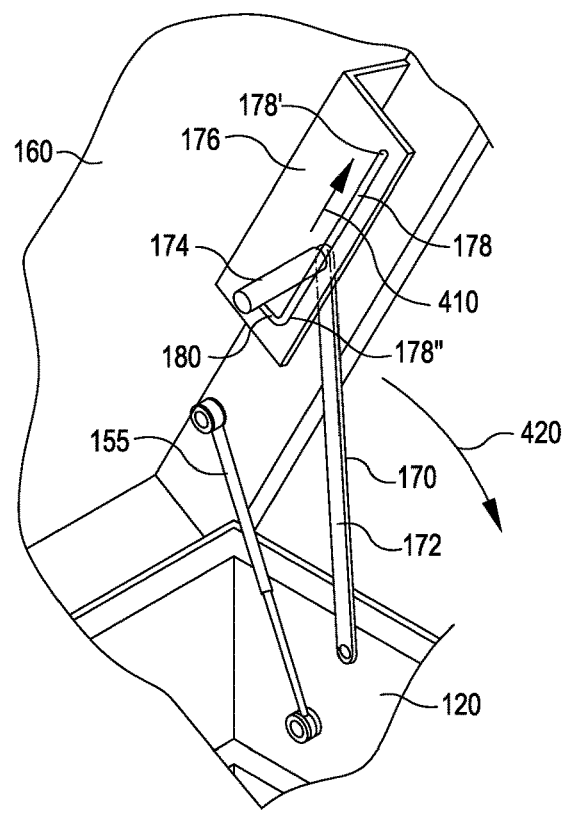
FIG. 6 is another enlarged cutaway perspective view of a portion of the utility junction box illustrated in FIG. 3 further illustrating the lid latching mechanism and the lid lift assist mechanism with the lid latching mechanism in an unlocked and in-use configuration.

Referring now also to FIGS. 5 and 6, in the illustrated embodiment, the utility junction box 100 may include a gas assist strut 155 to facilitate moving the lid 160 from the normally closed position in FIGS. 1 and 4 to the open position in FIG. 3 for installation and/or servicing of utility lines and components contained therein. The gas assist strut 155 is of the type found in use on hatchbacks and hoods of automobiles to assist the opening and closing of the hatchbacks and hoods by reducing the amount of force required to open and close the hatchbacks and hoods. The gas assist strut 155 may be pivotally attached to either of the right or left sidewalls 120 or 140 and to the interior sidewall of the lid 160. The utility junction box 100 may also include a sliding lid latch assembly 170 that holds the lid 160 into the open position until released. The lid latching assembly includes an elongated arm 172 pivotally attached to one of the right or left sidewalls 120 or 140 and slidingly connected to a bracket 176 attached on the underside of the lid 160. The bracket has an L-shaped slot 178 formed along its elongated axis with a shorter perpendicular slot 180 on its rearward facing end 178" directed towards the underside of the lid 160. As the lid 160 is moved from the closed position in FIGS. 1 and 4 to the open position in FIG. 3, the slotted handle 174 translates from the frontward end 178' of the slot 178 of the bracket 176 towards the rearward facing end 178" of the slot 178 of the bracket 176 and then slides into the perpendicular slot 180 locking the lid 160 into the open position. To close the lid 160, the slotted handle 174 must be pulled in the direction of arrow 400 such that the slotted handle 174 translates from within the perpendicular slot 180 towards the rearward facing end 178" of the bracket 176 into the slot 178 and moved in the direction of arrow 410 as the lid rotates in the direction of arrow 420 from the open to the closed position.

In an embodiment, the utility junction box 100 may be equipped with a lever handle and keyed locking mechanism 200 for locking the lid 160 of the utility junction box 100 which may only be opened with a key. In another embodiment, the utility junction box 100 may be fitted with one or more hasp assemblies 210 having an upper portion 212 attached to the lid 160 which mates with a lower portion 214 affixed to the front sidewall 110. The upper and lower portions 212, 214 of the hasp assemblies 210 include complementary apertures for receiving keyed or combination locks 215. The use of the keyed locking mechanism 200 or the hasp assemblies 210 and locks 215 individually is to secure the lid 160 in the locked position especially in situations where additional security may be needed during expected heavy weather and hurricane conditions with expected high winds and rains.

The entire exterior of the sidewalls 110, 120, 130 and 140 of the utility junction box 100 and lid 160 may be coated with a water and wind proofing material such as Wetsuit® or ceramic or other coating that provides protection from sunlight and heat. The interior of the sidewalls 110, 120, 130, 140 of the housing assembly may be likewise lined or coated with a waterproofing material such as Wetsuit® or a soundproofing material to reduce noise emanating from within the utility junction box 100.

In other embodiments, the utility junction box 100 and lid 160 may be any shape including square, rectangular, round or any other shape.

Thus, there has been shown and described several a utility junction box. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A utility junction box, comprising:
   a housing having at least one vertically oriented sidewall having an exterior planar surface;
   a plurality of first apertures formed in the sidewall; and
   a weather guard disposed entirely on the exterior planar surface of the sidewall, the weather guard having a downwardly sloping front face spaced apart from the exterior planar surface of the sidewall, the weather guard including a pair of sidewalls collectively forming with the sloping front face an enclosure with an open bottom, the sloping front face having a plurality of second apertures formed therein, each of the second apertures corresponding to one of the plurality of first apertures formed in the sidewall of the housing and spaced apart from and coincidentally from the corresponding first aperture.

2. The utility junction box of claim 1, further comprising the housing further including an open top opening into an interior volume for accessing utility lines within the interior volume.

3. The utility junction box of claim 2, further comprising the housing further including a hinged lid attached to at least one sidewall of the housing configured to allow access to the utility lines through the open top in an open configuration and sealing the open top during a closed and in-use configuration.

4. The utility junction box of claim 3, further comprising at least one lock for locking the lid in the closed configuration.

5. The utility junction box of claim 4, the at least one lock is a keyed locking mechanism.

6. The utility junction box of claim 4, the at least one lock is a combination lock and hasp assembly.

7. The utility junction box of claim 1, wherein the at least one sidewall is formed from a weather resistant material including stainless steel and aluminum.

8. The utility junction box of claim 1, wherein an exterior of the at least one sidewall is coated with a waterproofing material.

9. The utility junction box of claim 1, wherein the at least one sidewall is a left sidewall having the plurality of first apertures formed therein and the weather guard with a sloping front face having a plurality second apertures formed therein is disposed on the exterior planar surface of the left sidewall.

10. The utility junction box of claim 1, wherein the at least one sidewall is a rear sidewall having the plurality of first apertures formed therein and the weather guard with a sloping front face having a plurality second apertures formed therein is disposed on the exterior planar surface of the rear sidewall.

11. A utility junction box, comprising:
    a front, rear, right and left sidewall having an exterior planar surface and oriented substantially vertically, the front, rear, right and left sidewalls forming a housing having an open bottom opening into an interior volume for receiving one or more utility lines from a first location;
    a plurality of first apertures formed in the rear sidewall of the housing; and
    a weather guard disposed entirely on the exterior planar surface of the rear sidewall, said weather guard having a downwardly sloping front face and a pair of sidewalls collectively forming an enclosure with an open bottom, said sloping front face having a plurality of second apertures formed therein, one second aperture corresponding to one each of the plurality of first apertures formed in the rear sidewall of the housing and disposed a pre-determined distance and coincidentally from the corresponding first aperture;
    wherein each first aperture formed in the rear sidewall of the housing is configured to allow at least one utility line to pass from within the interior volume of the housing through the first aperture forming a first seal around the utility line and direct the utility line through the corresponding second aperture formed in the sloping front face of the weather guard forming a second seal around the utility line exterior to the housing and to a second location exterior to the utility junction box.

12. The utility junction box of claim 11, wherein the left sidewall includes having a plurality of first apertures formed therein and the weather guard with a sloping front face having a plurality second apertures formed therein is disposed on the exterior planar surface of the left sidewall, one second aperture corresponding to one each of the plurality of first apertures formed in the left sidewall of the housing and disposed a pre-determined distance and coincidentally from the corresponding first aperture.

13. The utility junction box of claim 11, further comprising the housing further including an open top opening into an interior volume for accessing the utility lines within the interior volume.

14. The utility junction box of claim 13, further comprising the housing further including a hinged lid attached to at least one sidewall of the housing configured to allow access to the utility lines through the open top in an open configuration and sealing the open top during a closed and in-use configuration.

15. The utility junction box of claim 14, further comprising at least one lock for locking the lid in the closed configuration.

16. The utility junction box of claim 15, the at least one lock is a keyed locking mechanism.

17. The utility junction box of claim 15, the at least one lock is a combination lock and hasp assembly.

18. The utility junction box of claim 11, wherein the front, rear, right and left sidewalls are formed from a weather resistant material including stainless steel and aluminum.

19. A utility junction box, comprising:
    a front, rear, right and left sidewall having a planar surface and oriented substantially vertically, the front, rear, right and left sidewalls forming a housing having an open top and open bottom opening into an interior volume for receiving one or more utility lines from a first location;
    a hinged lid fitted over the open top of the housing movable between open and closed positions, said hinged lid having a rim that extends over the front, rear, right and left sidewalls when the lid is in the closed position;
    a plurality of first apertures formed in the rear sidewall of the housing; and
    a weather guard disposed entirely on an exterior of the planar surface of the rear sidewall, said weather guard having a downwardly sloping front face and a pair of sidewalls forming an enclosure with an open bottom, said sloping front face having a plurality of second apertures formed therein, one second aperture corresponding to one each of the plurality of first apertures formed in the rear sidewall of the housing and disposed directly and coincidentally therefrom;
    wherein each first aperture formed in the sidewall of the housing is configured to allow at least one utility line to pass from within the interior volume of the housing through the first aperture forming a first seal around the utility line and direct the utility line through the corresponding second aperture formed in the sloping front face of the weather guard forming a second seal around the utility line exterior to the housing and to a second location exterior to the utility junction box.

20. The utility junction box of claim 19, wherein the left sidewall includes having a plurality of first apertures formed therein and the weather guard with a sloping front face having a plurality second apertures formed therein is disposed on the exterior planar surface of the left sidewall, one second aperture corresponding to one each of the plurality of first apertures formed in the left sidewall of the housing and disposed directly and coincidentally therefrom.

* * * * *